(12) United States Patent
Steger et al.

(10) Patent No.: US 8,965,179 B1
(45) Date of Patent: Feb. 24, 2015

(54) SYSTEMS AND METHODS FACILITATING THE GENERATION OF AUTOMATIC TRANSITIONS IN VIDEO

(75) Inventors: Eron Samuel Steger, Mountain View, CA (US); Ali E. El qursh, Piscataway, NJ (US)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 13/527,124

(22) Filed: Jun. 19, 2012

(51) Int. Cl.
*G11B 27/031* (2006.01)
*H04N 5/76* (2006.01)

(52) U.S. Cl.
CPC ............... *G11B 27/031* (2013.01); *H04N 5/76* (2013.01)
USPC .......................................................... 386/280

(58) Field of Classification Search
CPC .. G11B 27/034; G11B 27/105; G11B 27/036; H04N 9/8042; H04N 5/85
USPC .................................................. 386/274–290
See application file for complete search history.

(56) References Cited

U.S. PATENT DOCUMENTS

| | | | | |
|---|---|---|---|---|
| 5,870,494 | A * | 2/1999 | Kanda et al. | 382/197 |
| 7,142,250 | B1 * | 11/2006 | Black | 348/515 |
| 7,512,886 | B1 * | 3/2009 | Herberger et al. | 715/723 |
| 8,205,148 | B1 * | 6/2012 | Sharpe et al. | 715/203 |
| 8,363,161 | B2 * | 1/2013 | Pearlstein | 348/515 |
| 2003/0185445 | A1 * | 10/2003 | Chang et al. | 382/203 |
| 2008/0292137 | A1 * | 11/2008 | Rhoads | 382/100 |
| 2010/0061695 | A1 * | 3/2010 | Furmanski et al. | 386/52 |
| 2012/0057850 | A1 * | 3/2012 | Klappert | 386/278 |
| 2012/0148216 | A1 * | 6/2012 | Pavagada et al. | 386/278 |

OTHER PUBLICATIONS

ARToolKit: Feature List, 1 page, http://www.hitl.washington.edu/artoolkit/documentation/features.htm, Last accessed Aug. 31, 2012.
ARToolKit, 1 page, http://www.hitl.washington.edu/artoolkit/, Last accessed Aug. 31, 2012.
"BazAR: A vision based fast detection library," Ecole Polytechnique Federale de Lausanne, Sep. 14, 2007, 1 page, http://cvlab.epfl.ch/software/bazar/, Last accessed Aug. 31, 2012.
OpenCV, 1 page, http://tech.groups.yahoo.com/group/OpenCV/message/, Last accessed Aug. 31, 2012.

* cited by examiner

*Primary Examiner* — Gelek W Topgyal
(74) *Attorney, Agent, or Firm* — Amin, Turocy & Watson, LLP

(57) ABSTRACT

Systems and methods for facilitating automatic transitions in video are provided. In one embodiment, a system includes a memory that stores computer executable components, and a microprocessor that executes the computer executable components stored in the memory. The components can include a video editing component that generates an augmented video. The video editing component can include a video transition component that: accesses a first video having a marker; receives information indicative of a selection of the first video and a second video; correlates the marker with a marker of the second video; and augments the second video with the first video based, at least, on the correlating.

11 Claims, 12 Drawing Sheets

400

402

500

SYSTEMS AND METHODS FACILITATING THE GENERATION OF AUTOMATIC TRANSITIONS IN VIDEO

TECHNICAL FIELD

This disclosure generally relates to facilitating automatic transitions in video.

BACKGROUND

The ability for users to generate customized videos that include one or more video clips from different sources is of interest. Specifically, during video editing, transitions are often employed to display different videos (or clips of videos) in sequence. However, current video editing software typically includes transitions that provide few parameters that can be user customized. Accordingly, extensive manual labor is often needed to create a custom video transition.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In one or more embodiments, the disclosed subject matter relates to system facilitating automatic transitions in video. The system can include: a memory that stores computer executable components; and a microprocessor that executes computer executable components stored in the memory. The computer executable components can include a video editing component that generates an augmented video. The video editing component can include: a video transition component that: accesses a first video having a marker; receives information indicative of a selection of the first video and a second video; correlates the marker with a marker of the second video; and augments the second video with the first video based, at least, on the correlating.

In another embodiment, a method facilitating automatic transitions in video is provided. The method can include employing a microprocessor to execute computer executable components stored within a memory to perform the following: accessing a first video having a marker; receiving information indicative of a selection of the first video and a second video; correlating the marker with a marker of the second video; and augmenting the second video with the first video based, at least, on the correlating.

In another embodiment, another method facilitating automatic transitions in video is provided. The method can include employing a microprocessor to execute computer executable components stored within a memory to perform the following: automatically detecting a marker in a frame of a first video; computing a homography between the marker and a second video; and warping the second video into the first video.

In another embodiment, another method facilitating automatic transitions in video is provided. The method can include employing a microprocessor to execute computer executable components stored within a memory to perform the following: receiving an input video and a transition video; generating a frame comprising a frame of the input video overlaid on a marker of a frame of the transition video. The generating can include: determining the frame of the transition video; determining a frame of the input video; detecting one or more markers of the frame of the transition video; computing a location of a camera relative to the marker, the camera being associated with recording of the transition video; computing a transformation that warps a frame of the input video over the marker; warping the frame of the input video based on the transformation; and overlaying the frame of the input video over the marker, the overlaying being based, at least, on the warping.

In one or more embodiments, the disclosed subject matter relates to another system facilitating automatic transitions in video. The system can include: a memory that stores computer executable components; and a microprocessor that executes computer executable components stored in the memory. The computer executable components can include a video transition component that generates an augmented video. The video editing component can include: a marker determination component that automatically detects a marker in a frame of a first video; a homography component that computes a homography between the marker and a second video; and a warping component that warps the second video into the first video.

In one or more embodiments, the disclosed subject matter relates to another system facilitating automatic transitions in video. The system can include: a memory that stores computer executable components; and a microprocessor that executes computer executable components stored in the memory. The computer executable components can include a video transition component that generates an augmented video. The video transition component can include: a communication component that receives an input video and a transition video; and a video frame component that: determines a frame of the transition video; and determines a frame of the input video. The video transition component can also include: a video frame marker component that detects one or more markers of the frame of the transition video; a camera location component that computes, for the marker of the frame of the transition video, a location of a camera relative to the marker; a transformation component that computes a transformation associated with warping the first video and the transition video; a warping component that warps the frame of the input video based on the transformation; and a video augmentation component that overlays the frame of the input video over the marker, the overlaying being based, at least, on the warping.

In another embodiment, another method facilitating automatic transitions in video is provided. The method can include employing a microprocessor to execute computer executable components stored within a memory to perform the following: generating a frame comprising a frame of a first input video overlaid on a marker of a frame of a second input video. In some embodiments, generating can include: determining a frame of a transition video; determining a frame of the first input video; detecting one or more markers of the frame of the transition video; computing, for the marker of the frame of the transition video, a location of a camera relative to the marker, the camera being associated with recording of the transition video; computing a transformation that warps a frame of the first input video over the frame of the second input video; warping the frame of the first input video based on the transformation; and overlaying the frame of the first input video over the second input video, the overlaying being based, at least, on the warping.

In another embodiment, another method facilitating automatic transitions in video is provided. The method can include employing a microprocessor to execute computer executable components stored within a memory to perform the following: receiving a first input video, a second input video and a transition video; and generating a frame comprising a frame of the first input video overlaid on a marker of a frame of the second input video. The generating can include: determining a frame of the transition video; determining a frame of the first input video; detecting one or more markers of the frame of the transition video; computing a transformation that warps a frame of the first input video over the frame of the second input video. The transformation can be based, at least, on: the marker of the frame of the transition video; and a location of a camera relative to the marker, the camera being associated with recording of the transition video. The method can also include: warping the frame of the first input video based on the transformation; and overlaying the frame of the first input video over the second input video, the overlaying being based, at least, on the warping.

Toward the accomplishment of the foregoing and related ends, the one or more embodiments include the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
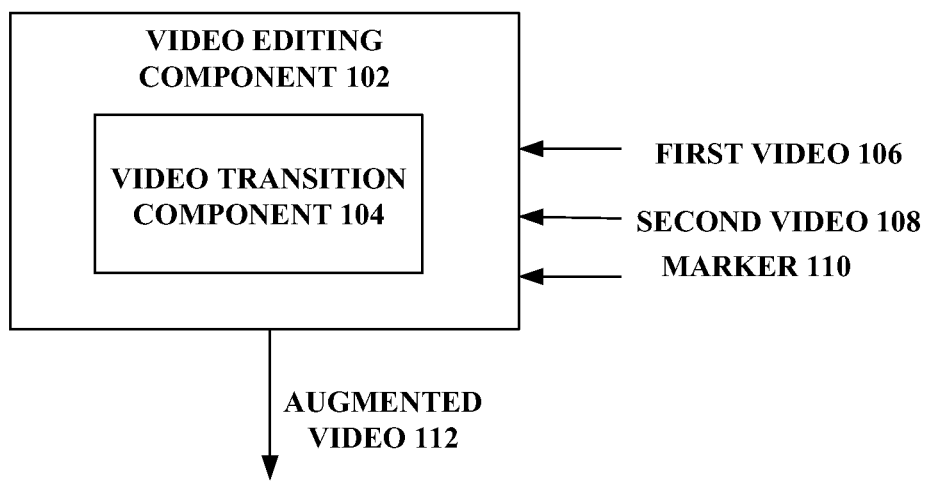
FIG. 1 is an illustration of a block diagram of an exemplary non-limiting system that facilitates automatic transitions in video in accordance with embodiments described in this disclosure.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is be evident, however, that such embodiments can be practiced without these specific details. In other instances, structures and devices are shown in block diagram form in order to facilitate describing one or more embodiments.

Systems and methods disclosed herein relate to generating automatic transitions in video. In particular, systems can access a first video having a marker, receive information indicative of a selection of the first video and indicative of a selection of a second video, correlate the marker with a marker of the second video and augment the second video with the first video based, at least, on the correlating performed. As used herein, correlating the marker with a marker of the second video can include, but is not limited to, comparing the marker with a marker of the second video, determining a similarity between the marker and the marker of the second video and/or matching a location of the marker and a location of the marker of the second video. In some embodiments, augmenting the second video with the first video includes warping the first video over the second video, based on the marker. Augmenting, or warping, can be performed utilizing customized video markers that can be automatically generated.

In various embodiments, the systems and methods disclosed herein advantageously enable customized transitions to be automatically generated for the video.

Turning now to the drawings, FIG. 1 is an illustration of a block diagram of an exemplary non-limiting system that facilitates automatic transitions in video in accordance with embodiments described in this disclosure. The system 100 can include a video editing component 102 that includes a video transition component 104. The video editing component 102 can be configured to perform video editing including, but not limiting to, automatically generating transitions in video via the video transition component 104.

In some embodiments, as shown, the system 100 can also include a first video 106, a second video 108 and a marker 108. The system 100 can be configured to perform video editing including, but not limiting to, automatically generating transitions in video.

In some embodiments, the video transition component 104 of the system 100 can receive the first video 106, the second video 108 and/or the marker 110, and automatically generate a transition between the first video 106 and the second video 108. The video transition component 104 can warp the first video 106 and the second video 108 onto one another in some embodiments. In various embodiments, warping a first video 106 onto a second video 108 includes, but is not limited to, overlaying the second video 108 onto the first video 106, or vice versa. In some embodiments, the overlay can correspond to a location of marker 110. In these embodiments, the marker 110 can be embedded in (or otherwise associated with) the first video 106. The marker 110 can include a recognizable pattern for detection of the location of the marker 110.

The video transition component 104 (and/or the video editing component 102, as shown) can output an augmented video 112. In various embodiments, an augmented video 112 can include a modified version of the first video 106 and/or the second video 108. In some embodiments, the augmented video is a video including content from the first video 106 and the second video 108, wherein the first video 106 is warped onto the second video 108 and/or the second video 108 is warped onto the first video 106.

Figure 2:
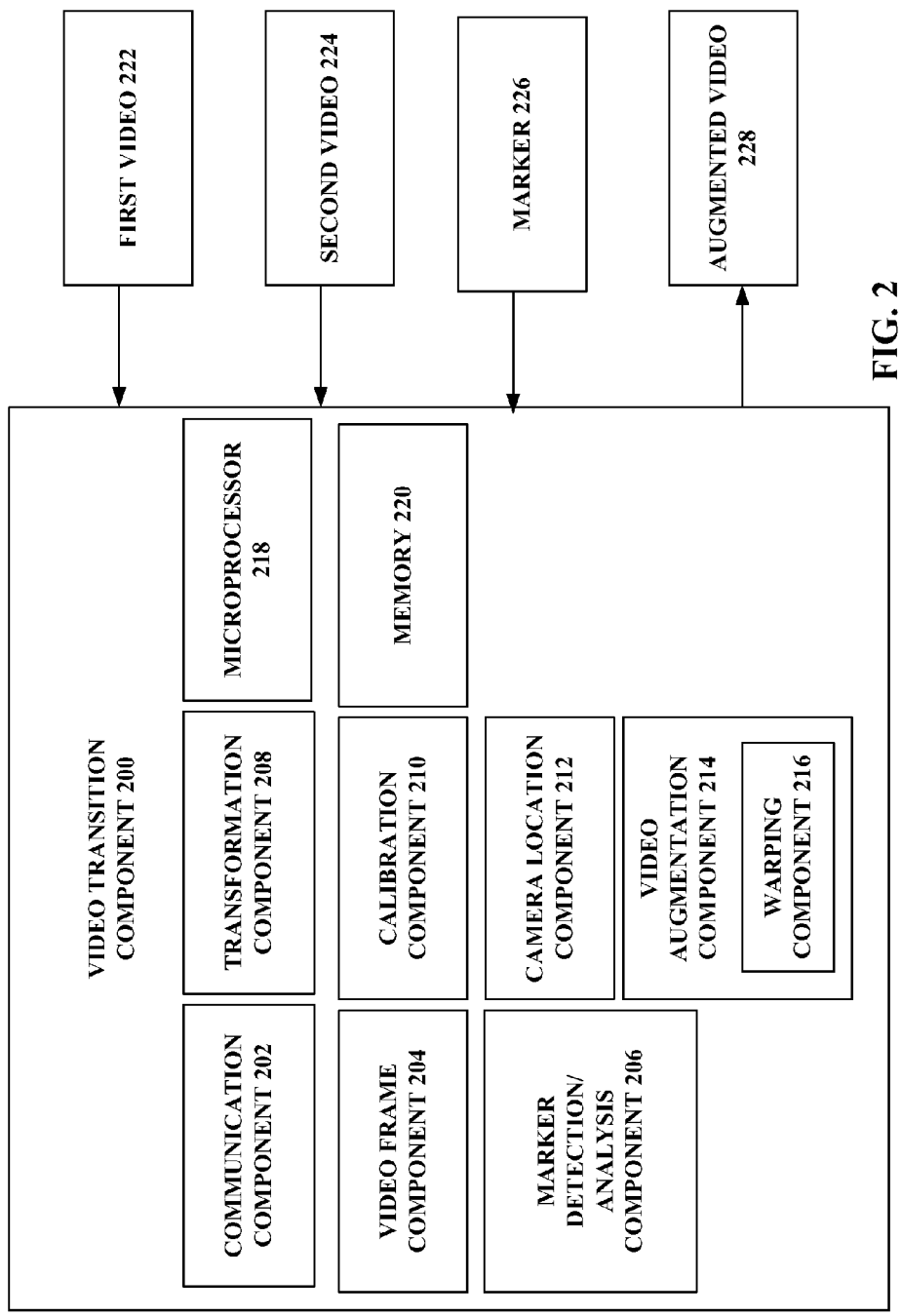
FIG. 2 is an illustration of a block diagram of an exemplary non-limiting system including a video transition component that facilitates automatic transitions in video in accordance with embodiments described in this disclosure.

FIG. 2 is an illustration of a block diagram of an exemplary non-limiting system including a video transition component that facilitates automatic transitions in video in accordance with embodiments described in this disclosure. In some embodiments, the structure and/or functionality of video transition component 104 can be as described with reference to video transition component 200 illustrated in FIG. 2.

The system can include a video transition component 200. The video transition component 200 can include a communication component 202, video frame component 204, a marker detection/analysis component 206, a transformation component 208, a calibration component 210, a camera location component 212, a video augmentation component 214 (which can include a warping component 216, in some embodiments), a microprocessor 218 and/or memory 220. In some embodiments, one or more of the communication component 202, video frame component 204, marker detection/ analysis component 206, transformation component 208, calibration component 210, camera location component 212, video augmentation component 214 (which can include warping component 216, in some embodiments), microprocessor 218 and/or memory 220 can be electrically and/or communicatively coupled to one another to perform one or more of the functions of the video transition component 200 described in this disclosure.

As shown, in some embodiments, the system of FIG. 2 can include a first video 222, a second video 224, a marker 226. The system can output an augmented video 228. In some embodiments, the augmented video 228 can include the second video 224 (or a portion thereof) overlaid on the video marker 226 of the first video 222.

In some embodiments, the communication component 202 can receive a first video 222, a second video 224 that can be augmented with the first video 222 and/or a marker 226. In some embodiments, the marker 226 can be included in the first video 222. The communication component 202 can output an augmented video (e.g., augmented video 228).

The video frame component 204 can separate a video received at the video transition component 200 into one or more video frames. The video frames of the first video 222, for example, can be processed and the frames can be augmented frame-by-frame with the second video 224.

The marker detection/analysis component 206 can detect one or more markers 226 and/or one or more marker boards including one or more markers 226. In some embodiments, the marker detection/analysis component 206 can automatically generate one or more markers 226 and/or automatically generate a marker board including one or more markers 226. By way of example, but not limitation, the markers 226 and/or marker boards can be embedded in the first video 222 and the second video 224 can overlay the first video 222 at a location corresponding to the one or more markers 226 and/or one or more markers of the marker board.

The transformation component 208 can compute a transformation to warp the second video 224 onto the first video 222 at a location corresponding to a marker 226 of the first video 222.

The calibration component 210 can generate calibration information to calibrate information associated with the camera that recorded the first video 222 and/or the second video 224. The camera location component 212 can detect the location of the camera.

The video augmentation component 214 can augment the first video with the second video 224 at a location corresponding to one or more markers. The warping component 216 can warp the second video 224 onto the first video based on the transformation (which can include warping component 216, in some embodiments)

Microprocessor 218 can perform one or more of the functions described in this disclosure with reference to any of the systems and/or methods disclosed. The memory 220 can be a computer-readable storage medium storing computer-executable instructions and/or information for performing the functions described in this disclosure with reference to any of the systems and/or methods disclosed. For example, as shown, memory 220 can store computer-executable instructions in some embodiments, for performing the functions of the video transition component 200 and/or the video editing component 102.

The functionality of video transition component 200 (and/ or components thereof) can be as described with reference to FIGS. 3, 4A, 4B, 5 and 6.

Figure 3:
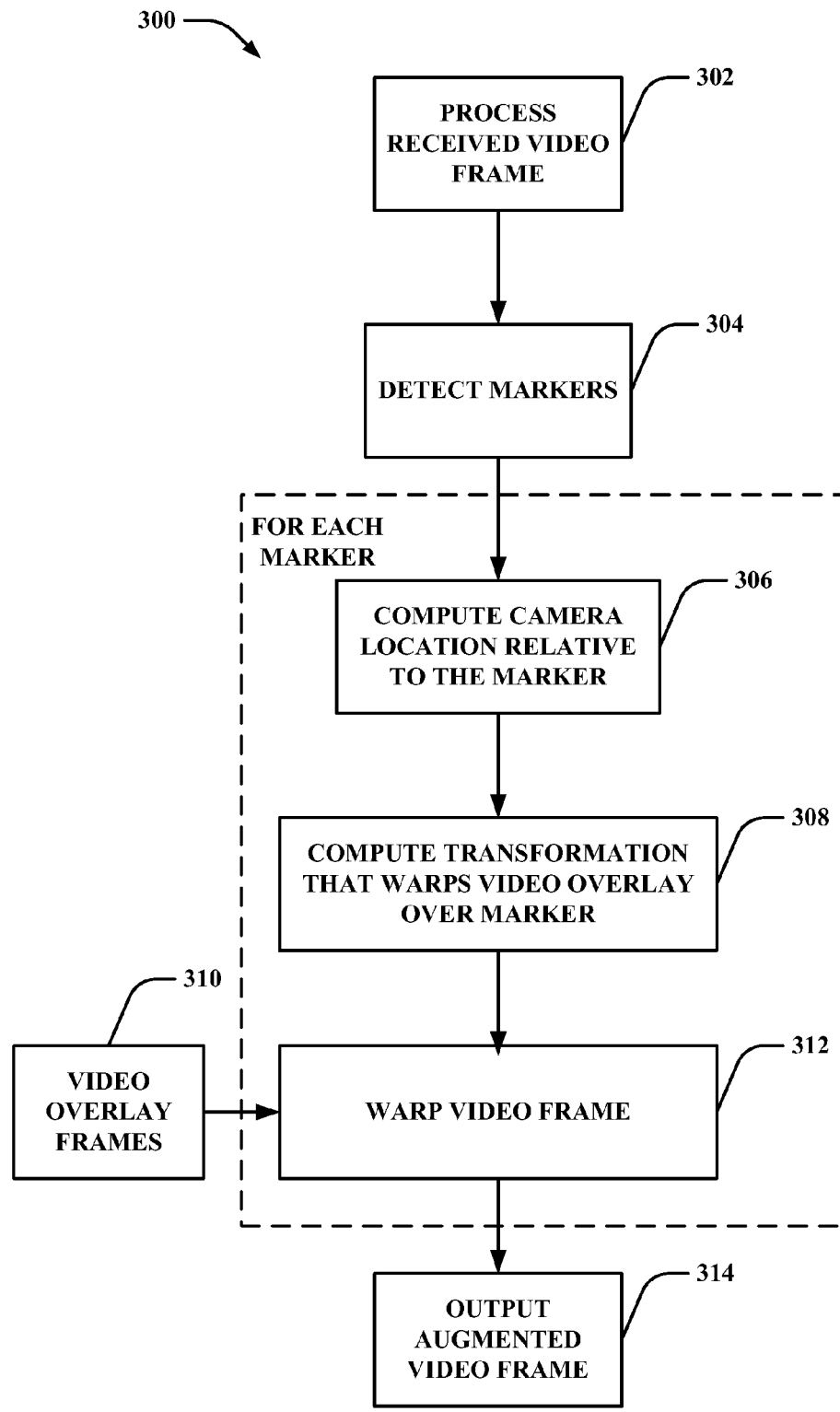
FIG. 3 is an illustration of an exemplary flow diagram of a method facilitating automatic transitions in video in accordance with embodiments described in this disclosure.

FIG. 3 is an illustration of an exemplary flow diagram of a method facilitating automatic transitions in video in accordance with embodiments described in this disclosure. In various embodiments, systems and methods described in this disclosure can provide a video overlay effect that can overlay one or more videos over an input video. In some embodiments, overlaying can be performed such that the video overlays appear over markers in the input video, for example.

In some embodiments, at 302, method 300 can include processing a received video frame (e.g., using the video frame component 204). In some embodiments, although not shown, method 300 can include accessing and/or receiving a video, and generating a frame of the video (e.g., using the video frame component 204).

At 304, method 300 can include detecting markers of the input video frame (e.g., using the marker detection/analysis component 228). In some embodiments, detecting markers can include detecting the location of the marker in the input video. Detection of the marker can enable the systems and methods described in the disclosure to overlay a second video (or a transition video) on a region of the marker of the first input video. In some embodiments, the markers can be planar markers.

In various embodiments, detection of the location of the marker can involve tracking the location information for the marker from a previous frame.

In some embodiments, the marker detection can be performed based on the manner in which the marker is designed and/or the appearance of the marker. In the embodiments described in this disclosure, the appearance of the marker can be selected.

In some embodiments, the marker can be detected by thresholding a portion of the video frame (e.g., image in the video frame) to get a binary image and determining connected components of the binary image. Contours of the connected components can be determined, and line segments can be detected for the contours. With regard to determining the contours of the connected components, polygonal approximations of the contours can be determined. In various embodiments, concave contours with exactly four corners can be saved while other contours can be discarded in some embodiments. In some embodiments, the corners can be sorted in an anti-clockwise direction.

The corners of the square of marker can be detected based on the detection of the line segments. In some embodiments, the borders with a number of points less than a predetermined value can be removed.

Further, a template can be employed to match the interior of the pattern of marker to find the correct orientation of the marker and/or the frame of the input video having marker.

In some embodiments, white squares of the marker pattern can be dilated by one pixel so that the black squares of the marker pattern do not overlap or touch one another. The approximation can be to a rectangle to extract the black squares. The inner corners can be selected by rejecting the points that don't belong to two extracted rectangles.

In embodiments in which a marker is not provided to the video transition system and/or more flexibility is desired in the markers that are employed for generating the video transitions, one or more feature points in the frame of the input video can be matched with known images of the pattern of the marker. Once matching is performed, the known planar object identified can be identified.

After the marker is detected, the marker identification for the detected marker can be determined.

In some embodiments, markers can be automatically generated. For example, marker patterns can be stored in separate files prior to detection. The files can be automatically generated to reduce the likelihood of error in, and the extensive time typically involved, in generating the files. The binary representation of the marker can receive a marker identification as input and generate a marker file.

Figure 4A:
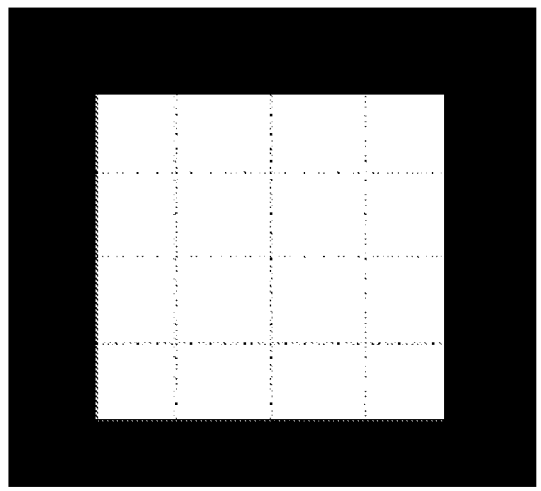
FIG. 4A is an illustration of a diagram of an exemplary marker pattern that facilitates automatic marker generation for facilitating video transitions in accordance with embodiments described in this disclosure.

FIG. 4A is an illustration of a diagram of an exemplary marker pattern that facilitates automatic marker generation for facilitating video transitions in accordance with embodiments described in this disclosure. The marker pattern can be generated based on bit values of the marker identification in some embodiments. For example, for a 16-bit integer, the colors of 16 internal squares can be generated as black or white squares depending on the value of the corresponding bit.

Figure 4B:
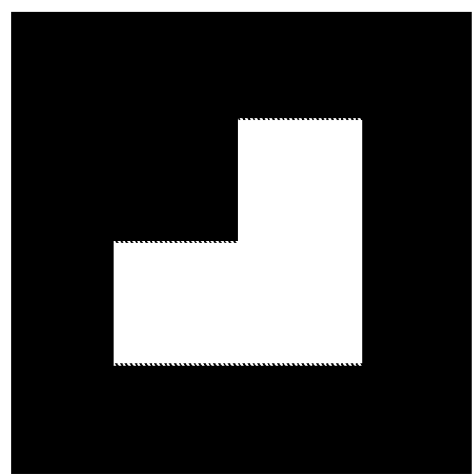
FIG. 4B is an illustration of a diagram an exemplary marker corresponding to a selected marker identification for generating video transitions in accordance with embodiments described in this disclosure.

FIG. 4B is an illustration of a diagram an exemplary marker corresponding to a selected marker identification for generating video transitions in accordance with embodiments described in this disclosure. The pattern shown in FIG. 4B can correspond to the marker identification 51, for example. By way of example, but not limitation, the markers can have a black square boundary and a selected pattern inside the boundary. In some embodiments, the marker can be marker 402 shown in FIG. 4B.

Figure 5:
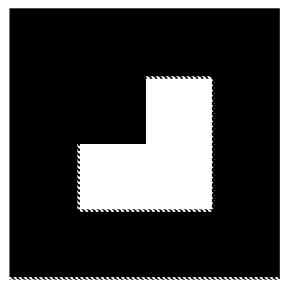
FIG. 5 is an illustration of a marker board for facilitating video transitions in accordance with embodiments described in this disclosure.
Figure 5:
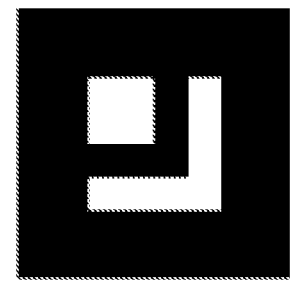
Figure 5:
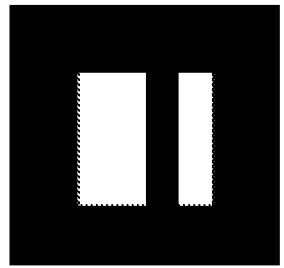
Figure 5:
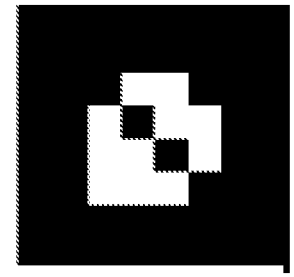

Turning now to FIG. 5, FIG. 5 is an illustration of a marker board for facilitating video transitions in accordance with embodiments described in this disclosure. In some embodiments, marker boards can be employed in lieu of a single marker to improve reliability of marker detection. The marker board 500 can include a plurality of markers arranged in a grid layout. By way of example, but not limitation, the grid layout can be the layout of four markers as shown in marker board 500 of FIG. 5.

In some embodiments, if any marker in the marker board 500 is detected, the location of the marker board can be detected in the image in the input video frame. Accordingly, the reliance on only a single marker is reduced and if a portion of the single marker is occluded, marker detection can be performed.

By way of example, but not limitation, a method can include identifying one or more markers in the marker board. Upon identifying the one or more markers, the camera location of each of the markers can be identifying and a transformation can be computed for each of the identified markers. In various embodiments, a number of different videos can be warped onto the first input video associated with the one or more markers. The different videos can be warped onto the first input video at locations corresponding to the locations of the one or more markers of the marker board.

In some embodiments, several markers can be grouped. For example, in some embodiments, several markers can be provided on a single sheet of paper (or other surface including, but not limited to, film or the like). If any marker in the group of markers is detected, the correct location of the marker board that includes the markers can be detected in an image. For example, the image can be an image associated with the first input video.

In some embodiments, a class can be employed to abstract a collection of markers in a grid layout. An image of an entire marker board can be generated and/or a collection of markers can be abstracted in a grid layout. For example, a number of rows and/or columns of a desired grid of markers, the marker identifications of the markers to include on the marker board (e.g., in row-major order) and/or the vertical and horizontal gaps between the markers, can be received. The marker board can be constructed with the requested markers in the row-major order and/or grid specified.

Given a set of marker detections in an image, the class can determine which marker detections correspond to markers on the marker board. If at least one marker is detected, the corresponding camera location can be computed. In some embodiments, the class can generate an image of the marker board.

In some embodiments, a determination can be made as to whether any other object occludes the marker board and the method can avoid overlaying a video over portions of the input video frame having any other object occluding the marker.

In some embodiments, the video can be re-lighted to match the lighting of the augmented video. In some embodiments, a zoom or pan in transition can be employed in the transitions. In some embodiments, probabilistic tracking of the markers can be employed.

Turning back to FIG. 3, for each marker detected, at 306, method 300 can include computing a camera location relative to the detected marker (e.g., using the camera location component 212). If at least one marker is detected on the marker board 400, the corresponding camera location can be computed.

For each marker detected, at 308, method 300 can also include computing a transformation that warps a video overlay over a marker (e.g., using the transformation component 208). The transformation can be computed based on the location of the camera relative to the detected marker. In some embodiments, the transformation can warp the overlay image in the transition and/or second video over a pattern in the marker of the input video.

Figure 6:
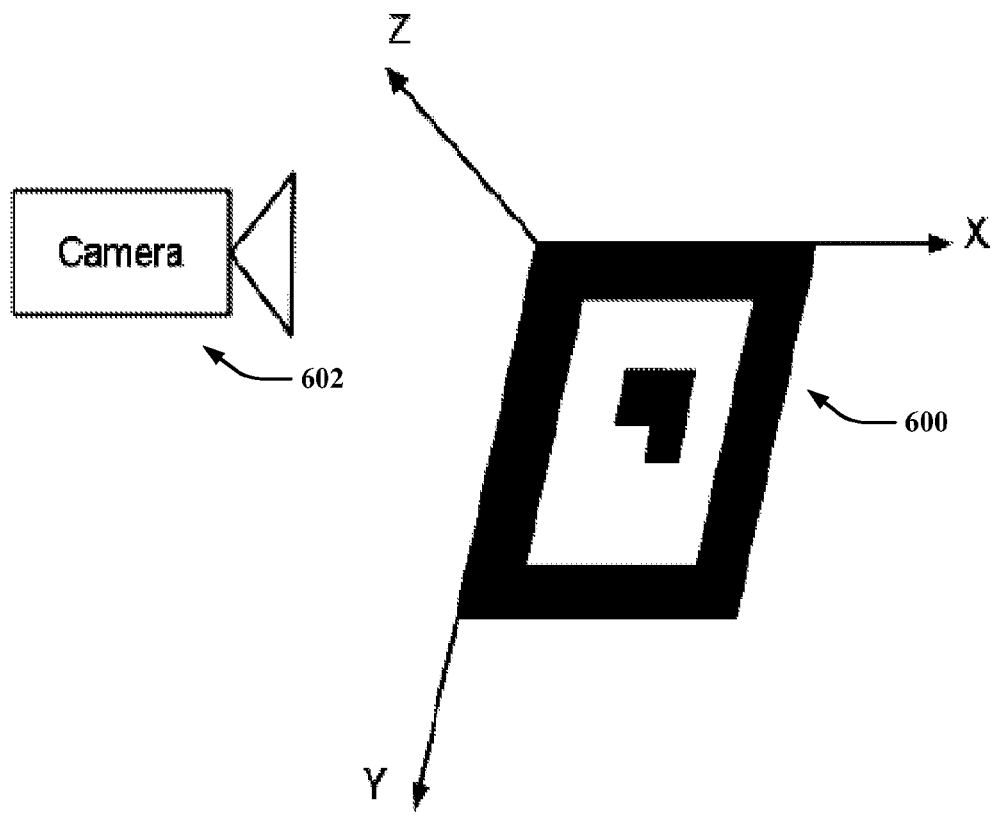
FIG. 6 is an illustration of an exemplary coordinate system and corresponding camera for computing a transformation for facilitating video transitions in accordance with embodiments described in this disclosure.

FIG. 6 is an illustration of an exemplary coordinate system and corresponding camera for computing a transformation for facilitating video transitions in accordance with embodiments described in this disclosure. As shown in FIG. 6, a marker 600 can be aligned along a three dimensional x, y, z coordinate. The orientation of the camera 602 recording the input video in which the marker frame is embedded can be positioned along the axis as shown in FIG. 6.

In some embodiments, computing the transform can include assuming that a world coordinate system such that shown in FIG. 6. In particular, the z=0 plane is the same as the plane of the marker (e.g., marker 402) and that the origin of the coordinate system coincides with the top left corner of the marker shown in FIG. 4B.

Given such a coordinate system, for z=0, the points that define the boundaries of the marker can be expressed as that shown in Equation (1):

$$X = [xy01]^T \quad \text{Equation (1)}$$

where x and y can be the coordinates corresponding to the corners on the plane defined by the marker. The "1" in Equation (1) can represent points in homogeneous coordinates. X can represent a point in three-dimensional space, defined such that when z=0, it is on the same plane as the marker is in the world.

From the marker detection step, the corresponding corners in image coordinates of Equation (2) can also be represented in homogeneous coordinates.

$$p = [x'y'1] \quad \text{Equation (2)}$$

The relationship between the three dimensional points and the image points can then be represented by Equation (3):

$$\lambda p = K[R|t]X \quad \text{Equation (3)}$$

where K can be the calibration (or camera) matrix, [R|t] represents the camera's rotation (e.g., orientation) and translation (e.g., position), respectively. R can be a matrix, t can be a vector, and [R|t] can be a matrix made by combining R and t.

Turning back to FIG. 3, for each marker detected, at 312, method 300 can include warping the input video frame (e.g., using the warping component 226).

At 310, method 300 can include incorporating one or more video overlay frames to warp the video frame (e.g., using the video augmentation component 214).

At 314, method 300 can include outputting an augmented video frame (e.g., using the communication component 234). The method 300 can be repeated one or more times for corresponding input video frames in order to generate one or more respective augmented video frames.

Figure 7:
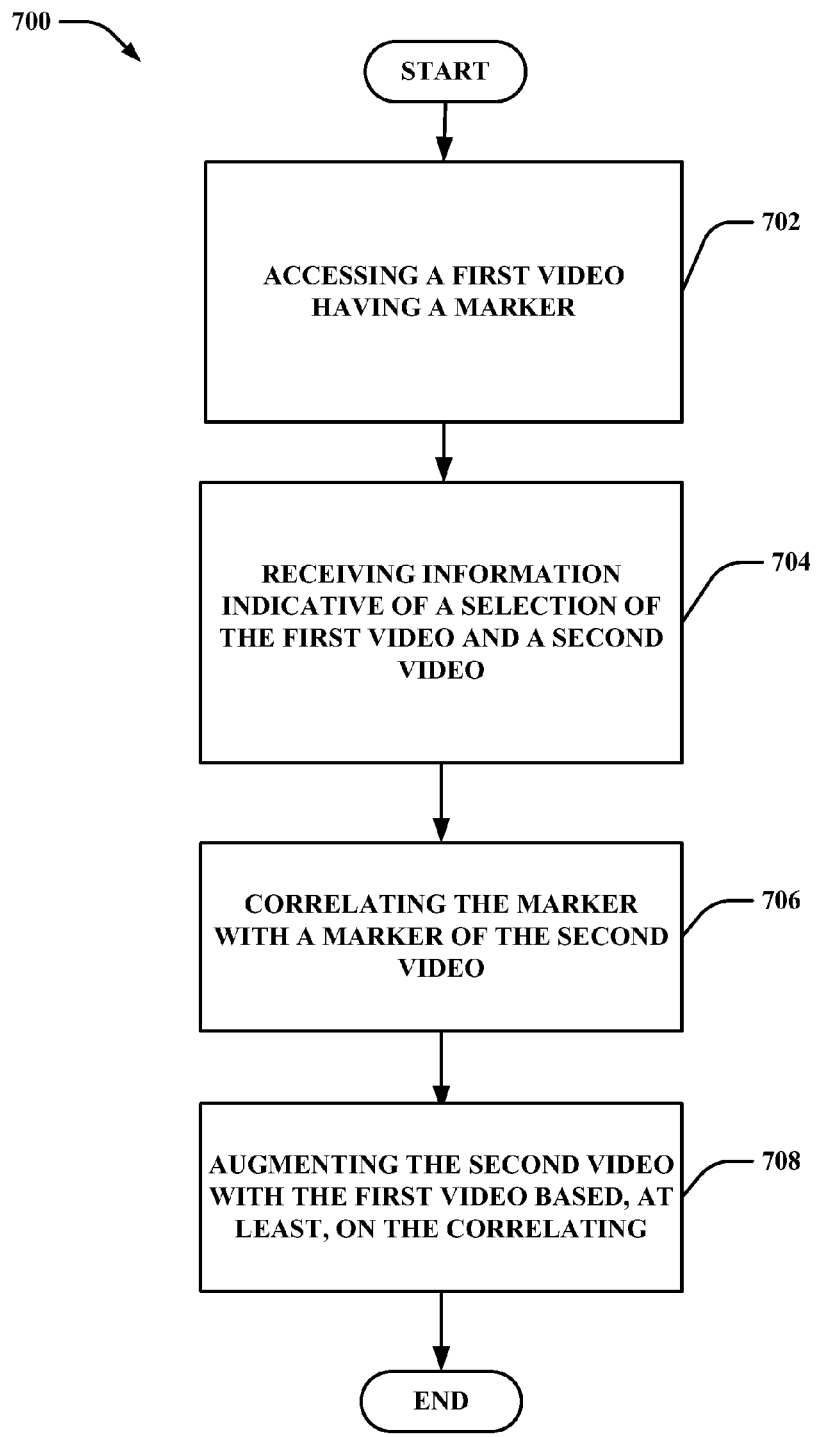
FIGS. 7, 8, 9 and 10 are illustrations of exemplary flowcharts of methods facilitating automatic transitions in video in accordance with embodiments described in this disclosure.

FIGS. 7, 8, 9 and 10 are illustrations of exemplary flowcharts of methods facilitating automatic transitions in video in accordance with embodiments described in this disclosure. Turning first to FIG. 7, method 700 can include accessing a first video having a marker. At 702, method 700 can include receiving information indicative of a selection of the first video and a second video (e.g., using the communication component 202).

At 704, method 700 can include correlating the marker with a marker of the second video (e.g., using the marker detection/analysis component 206). In some embodiments, the marker is printed prior to the accessing. In some embodiments, the first video is recorded with the marker prior to the accessing the first video having the marker. For example, a user can record a video having a selected pattern and upload the video to the video transition component. The user can also select two videos, an original video and a second or transition video. The second or transition video can be augmented with the original video in some embodiments.

In some embodiments, the correlating includes thresholding an image of the first video, and determining a binary representation of a thresholded image. After the binary representation is determined, in some embodiments, correlating can include determining connected components within the binary representation and determining contours of the connected components. Line segments of the contours can then be determined. In some embodiments, corners of a polygon (e.g., square) within the binary representation can be determined and a match can be made with a marker within the interior of the polygon. After the match is made with the marker, in some embodiments, the correct orientation of the first video can be determined.

At 706, method 700 can include augmenting the second video with the first video based, at least, on the correlating (e.g., using the video augmentation component 214).

Figure 8:
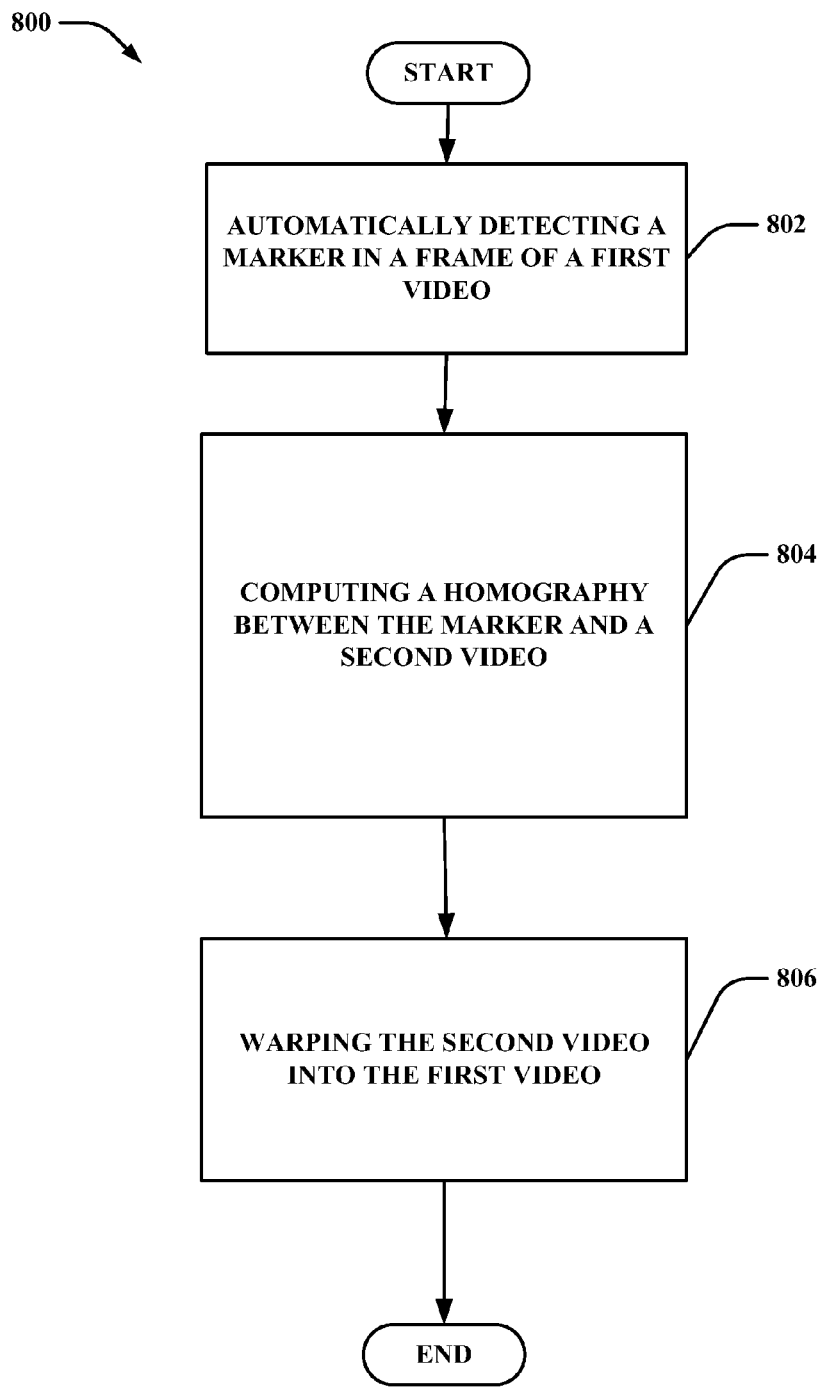

Turning now to FIG. 8, at 802, method 800 can include automatically detecting a marker in a frame of a first video (e.g., using the marker detection/analysis component 206). In some embodiments, automatically detecting the marker can include receiving a marker identification. In some embodiments, the marker identification is a value (e.g., an integer) having bits that correspond to respective areas in an internal region in the marker.

Automatically detecting the marker can also include generating a design for the marker associated with the marker identification. In some embodiments, generating the design can include associating a first color or a second color with the respective areas in the internal region based, at least, on values of the bits. In some embodiments, the first color and second color can be black and white, respectively (or vice versa).

At 804, method 800 can include computing a homography between the marker and a second video (e.g., using the transformation component 208). At 806, method 800 can include warping the second video into the first video (e.g., using the warping component 216). Although not shown, in some embodiments, method 800 can include generating a file including information identifying the marker (e.g., using the marker detection/analysis component 206).

Although not shown, in some embodiments, method 800 can include autocalibrating a camera employed to film the first video (e.g., using the calibration component 210).

Figure 9:
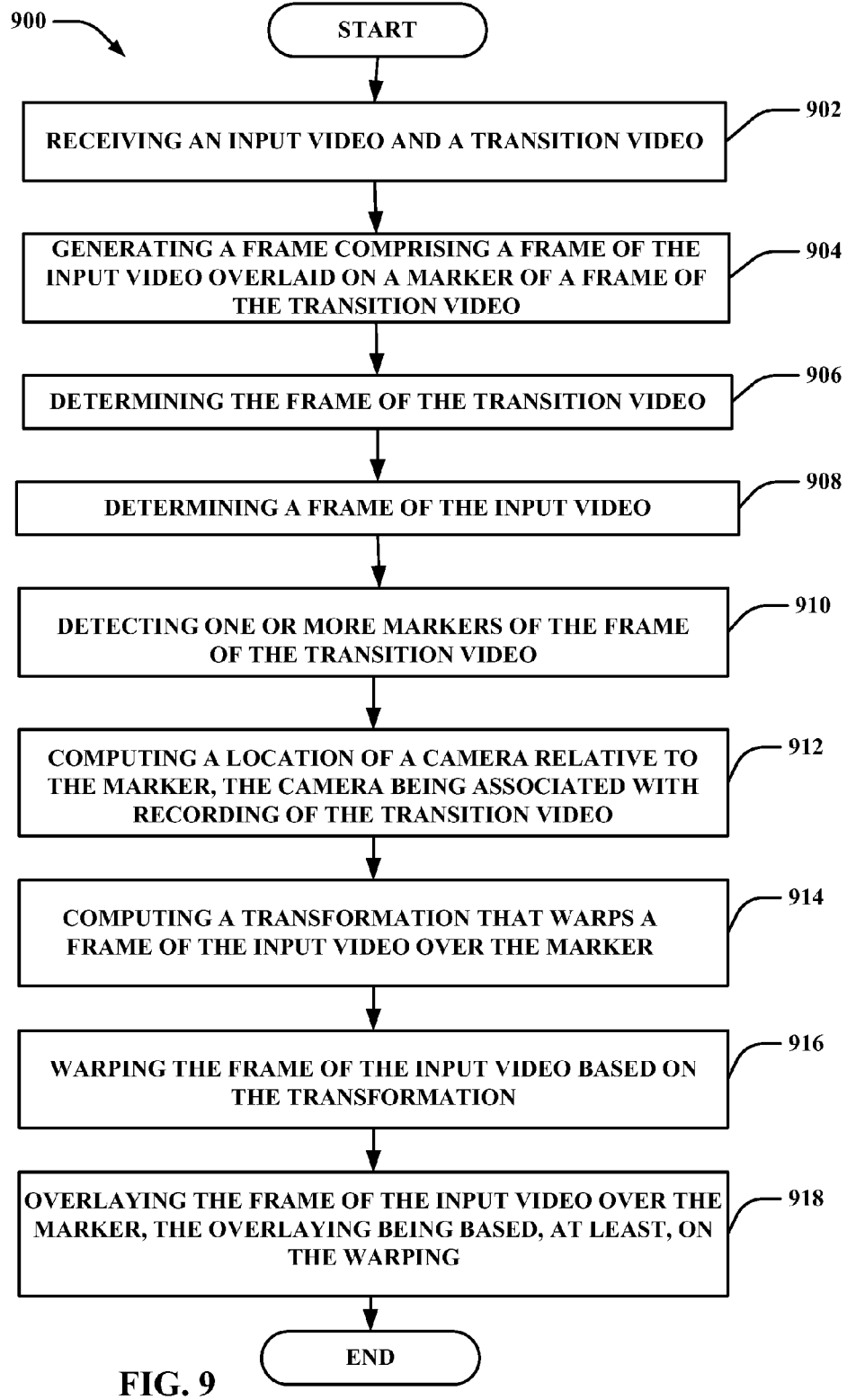

Turning now to FIG. 9, at 902, method 900 can include receiving an input video and a transition video (e.g., using the communication component 202). At 904, method 900 can include generating a frame comprising a frame of the input video overlaid on a marker of a frame of the transition video (e.g., using the video frame component 204). In some embodiments, generating the frame of the input video overlaid on the marker can include, at 906, determining the frame of the transition video (e.g., using the video frame component 204) and, at 908, determining a frame of the input video (e.g., using the video frame component 204).

As shown, generating the frame of the input video overlaid on the marker can also include, at 910, detecting one or more markers of the frame of the transition video (e.g., using the marker detection/analysis component 206). As also shown, generating the frame of the input video overlaid on the marker can also include, at 912, computing a location of a camera relative to the marker (e.g., using the camera location component 212). The camera can be associated with recording of the transition video. In some embodiments, computing the location of the camera is performed for the marker of the frame of the transition video.

Generating the frame of the input video overlaid on the marker can also include, at 914, computing a transformation that warps a frame of the input video over the marker (e.g., using the transformation component 208). Generating the frame can also include, at 916, warping the frame of the input video based on the transformation (e.g., using the warping component 216). Further, generation the frame can also include, at 918, overlaying the frame of the input video over the marker, the overlaying being based, at least, on the warping (e.g., using the video augmentation component 214).

Accordingly, in some embodiments, instead of warping the input videos over a transition video, the input videos can be warped over a different video. In this embodiment, the transition video can serve as a guide for the warping but the transition video is not part of the final output augmented video.

In some embodiments, although not shown, method 900 can also include outputting the frame of the input video overlaid on the marker (e.g., using the communication component 202).

Figure 10:
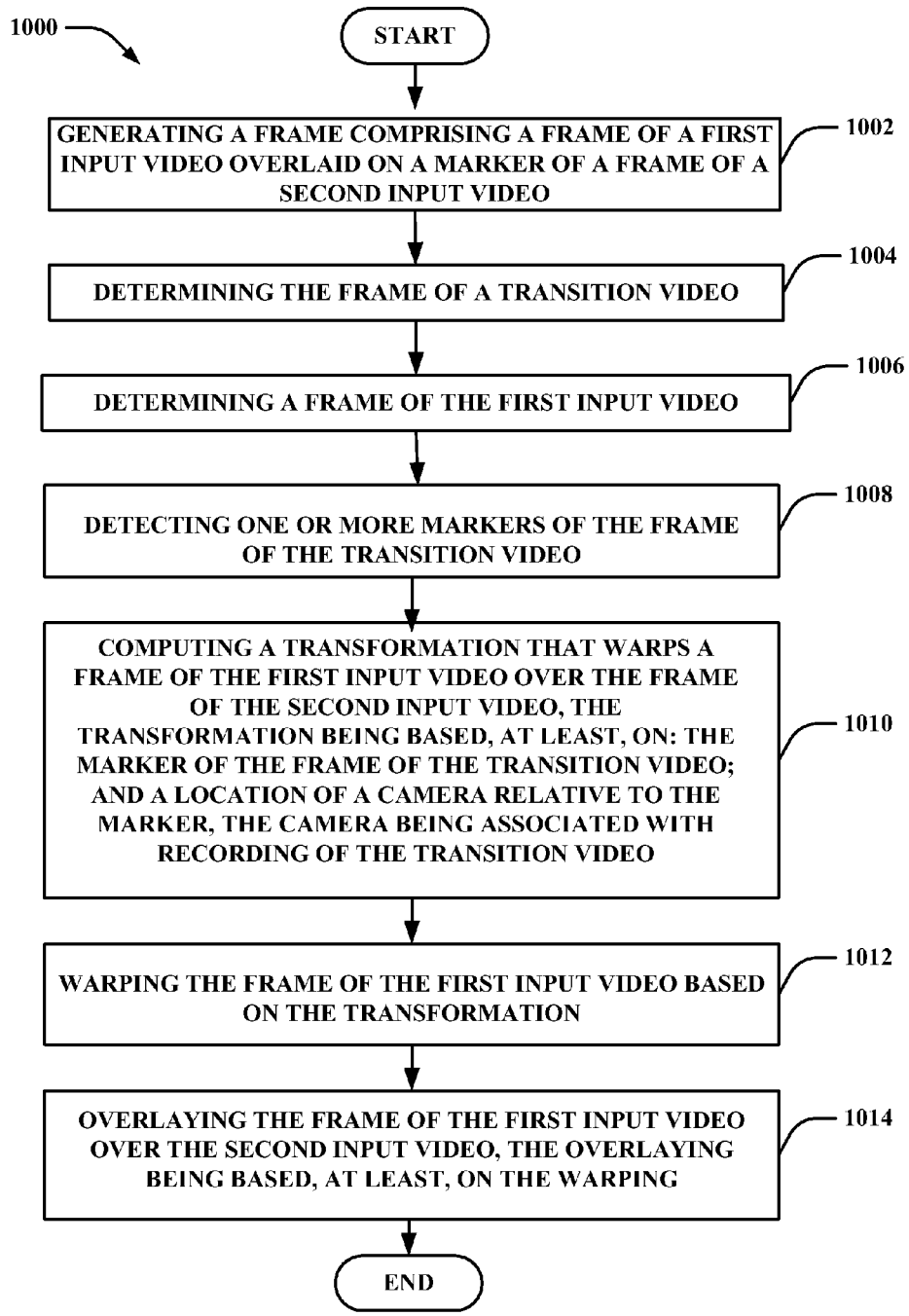

Turning now to FIG. 10, at 1002, method 1000 can include generating a frame comprising a frame of the input video overlaid on a marker of a frame of the transition video (e.g., using the video frame component 204). In some embodiments, generating the frame of the input video overlaid on the marker can include, at 1004, determining the frame of the transition video (e.g., using the video frame component 204) and, at 1006, determining a frame of the input video (e.g., using the video frame component 204). As shown, generating the frame of the input video overlaid on the marker can also include, at 1008, detecting one or more markers of the frame of the transition video (e.g., using the marker detection/analysis component 206).

As also shown, generating the frame of the input video overlaid on the marker can also include, at 1010, computing a transformation that warps a frame of the input video over the second input video (e.g., using the transformation component 208). The transformation can be based, at least, on the marker of the frame of the transition video, and a location of a camera relative to the marker, the camera being associated with recording of the transition video. Accordingly, computing both the camera location and the transformation can be performed in one step based on the detected marker.

Generating the frame can also include, at 1012, warping the frame of the input video based on the transformation (e.g., using the warping component 216) and, at 1014, overlaying the frame of the input video over the marker, the overlaying being based, at least, on the warping (e.g., using the video augmentation component 214).

In various embodiments, the systems and methods for warping a second video onto a first video having markers can be applied on a video (and/or image of the video frame) having multiple markers (or having multiple marker boards). For example, in these embodiments, one or more different videos can be warped onto the one or more of the markers (or one or more of the marker boards).

In various embodiments, the embodiments described in this disclosure can be or be included in systems that can: create an effect wherein a video plays inside of a photo album or newspaper, create a personal video with comments on another video, create a custom transition between two videos, and/or avoid manually coding of how to warp the video to the correct location in each frame.

In various embodiments, the embodiments described in this disclosure can be or be included in systems that can: track one or more points in the image based, at least, on the appearance of the point. For example, after effects can track a point in a video and make an overlay move with a motion corresponding to the location of the point.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
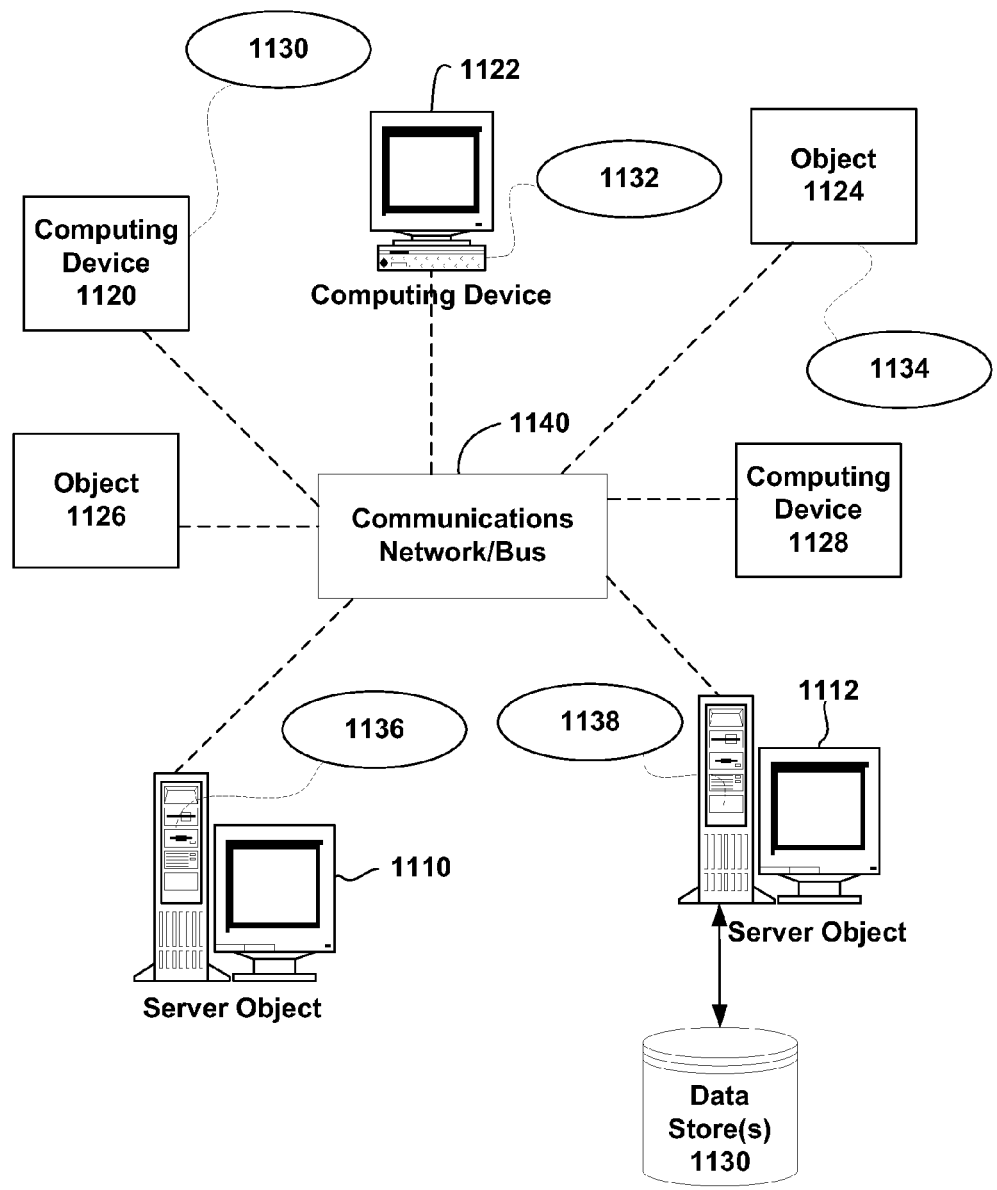
FIG. 11 is an illustration of a schematic diagram of an exemplary networked or distributed computing environment for implementing one or more embodiments described in this disclosure.

FIG. 11 provides a schematic diagram of an exemplary networked or distributed computing environment in which embodiments described in this disclosure can be implemented. The distributed computing environment includes computing objects 1110, 1112, etc. and computing objects or devices 1120, 1122, 1124, 1126, 1128, etc., which can include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. can include different devices, such as personal digital assistants (PDAs), audio/video devices, mobile phones, MPEG-1 Audio Layer 3 (MP3) players, personal computers, laptops, tablets, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 can include other computing objects and computing devices that provide services to the system of FIG. 11, and/or can represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices can process data, or request transaction services or tasks that can implicate the techniques for systems as described in this disclosure for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 1140 can be the Internet, for example, the computing objects 1110, 1112, etc. can be Web servers, file servers, media servers, etc. with which the client computing objects or devices 1120, 1122, 1124, 1126, 1128, etc. communicate via any of a number of known protocols, such as the hypertext transfer protocol (HTTP). Objects 1110, 1112, etc. can also serve as client computing objects or devices 1120, 1122, 1124, 1126, 1128, etc., as can be characteristic of a distributed computing environment.

Exemplary Computing Device

Figure 12:
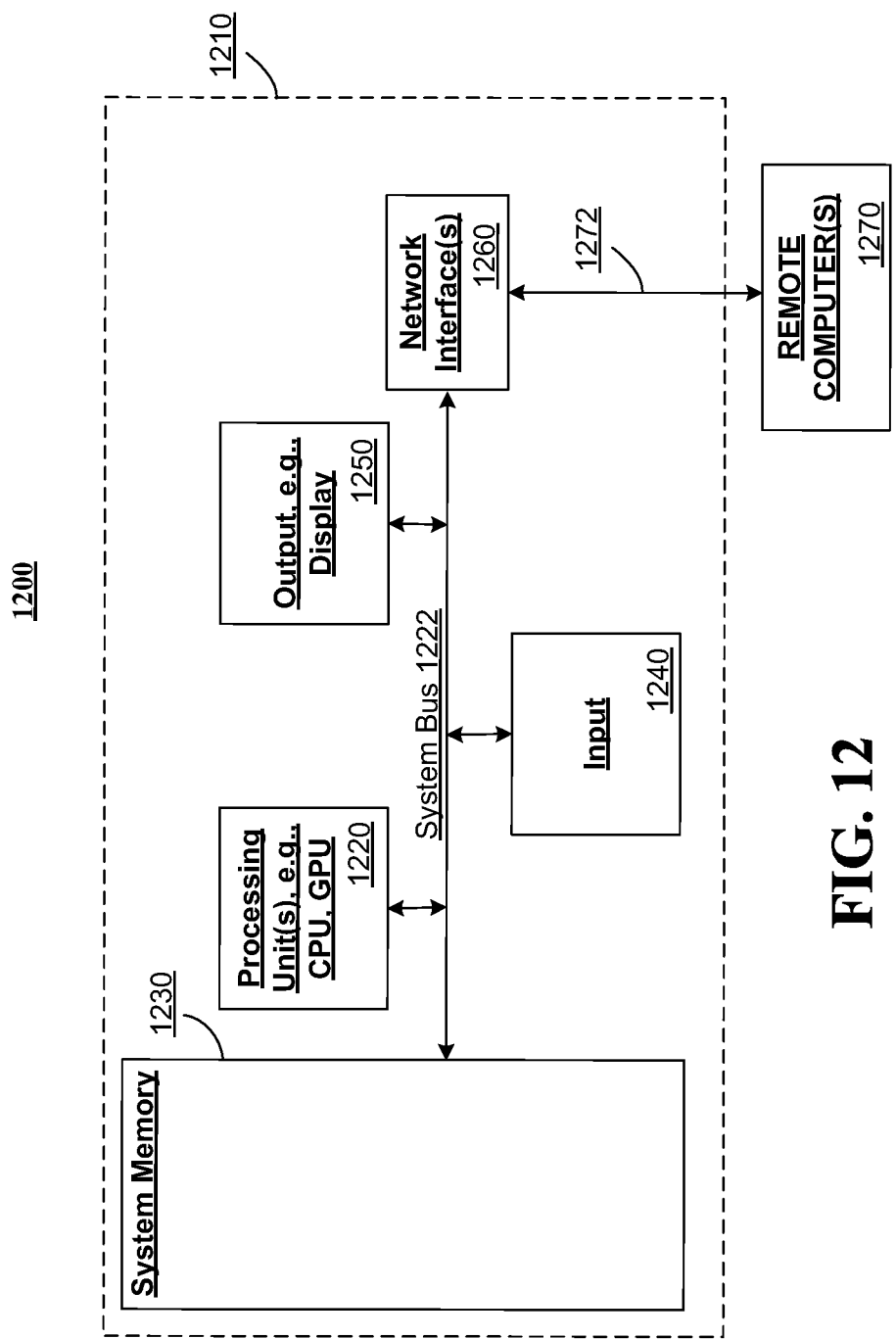
FIG. 12 is an illustration of a schematic diagram of an exemplary computing environment for implementing one or more embodiments described in this disclosure.

As mentioned, advantageously, the techniques described in this disclosure can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 12 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described in this disclosure can be implemented, although as made clear above, the computing system environment 1200 is only one example of a suitable computing environment and is not intended to suggest any limitation as to scope of use or functionality. Neither is the computing environment 1200 to be interpreted as having any dependency or requirement relating to any one or combination of components illustrated in the exemplary operating environment 1200.

With reference to FIG. 12, an exemplary computing environment 1200 for implementing one or more embodiments includes a computing device in the form of a computer 1210 is provided. Components of computer 1210 can include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 can include computer storage media in the form of volatile and/or nonvolatile memory such as read only memory (ROM) and/or random access memory (RAM). By way of example, and not limitation, memory 1230 can also include an operating system, application programs, other program modules, and program data.

A user can enter commands and information into the computer 1210 through input devices 1240, non-limiting examples of which can include a keyboard, keypad, a pointing device, a mouse, stylus, touchpad, touchscreen, trackball, motion detector, camera, microphone, joystick, game pad, scanner, video camera or any other device that allows the user to interact with the computer 1210. A monitor or other type of display device can be also connected to the system bus 1222 via an interface, such as output interface 1250. In addition to a monitor, computers can also include other peripheral output devices such as speakers and a printer, which can be connected through output interface 1250.

The computer 1210 can operate in a networked or distributed environment using logical connections to one or more other remote computers, such as remote computer 1270. The remote computer 1270 can be a personal computer, a server, a router, a network PC, a peer device or other common network node, or any other remote media consumption or transmission device, and can include any or all of the elements described above relative to the computer 1210. The logical connections depicted in FIG. 12 include a network 1272, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described in this disclosure. Thus, various embodiments described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Moreover, use of the term "an embodiment" or "one embodiment" throughout is not intended to mean the same embodiment unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. The invention is not to be limited to any single embodiment, but rather can be construed in breadth, spirit and scope in accordance with the appended claims.

What is claimed is:

1. A system comprising:
 a memory that stores computer executable components; and
 a microprocessor that executes the following computer executable components stored in the memory:
  a video editing component that generates an augmented video, the video editing component comprising:
   a video transition component that:
    accesses a first video having a first marker;
    receives information indicative of a selection of the first video and a second video;
    correlates the first marker with a second marker of the second video, wherein correlation comprises:
     determination of a match with a marker within an interior of a polygon;
     determination of a correct orientation of the first video based, at least, on the determination of the match;
    a thresholding of an image of the first video;
    determination of a binary representation of a thresholded image;
    determination of one or more connected components within the binary representation of the thresholded image;
    determination of one or more contours of the one or more connected components;
    determination of one or more line segments in the one or more contours; and
    determination of one or more corners of a polygon within the binary representation of the thresholded image; and
   augments the second video with the first video based, at least, on the correlation.

2. The system of claim 1, wherein augmentation comprises overlaying the second video on the first video.

3. The system of claim 1, wherein the first marker is printed prior to the video transition component access of the first video.

4. The system of claim 2, wherein the first video is recorded with the first marker prior to the video transition component access of the first video.

5. A method, comprising;
 employing a microprocessor to execute computer executable components stored within a memory to perform the following:
  accessing a first video having a first marker;
  receiving information indicative of a selection of the first video and a second video;
  correlating the first marker with a second marker of the second video, wherein the correlating comprises:
   determining a match with a marker within an interior of a polygon; and
   determining a correct orientation of the first video based, at least, on the determination of the match;
   thresholding of an image of the first video;
   determining a binary representation of a thresholded image;
   determining one or more connected components within the binary representation of the thresholded image;
   determining one or more contours of the one or more connected components;
   determining one or more line segments in the one or more contours; and
   determining one or more corners of a polygon within the binary representation of the thresholded image;
  augmenting the second video with the first video based, at least, on the correlating.

6. The method of claim 5, wherein the first marker is printed prior to the accessing.

7. The method of claim 5, wherein the first video is recorded with the first marker prior to the accessing the first video having the first marker.

8. A method, comprising;
 employing a microprocessor to execute computer executable components stored within a memory to perform the following:
  receiving an input video and a transition video;
  generating a frame comprising a first frame of the input video overlaid on a marker of a second frame of the transition video, the generating comprising:
   determining the second frame of the transition video;
   determining the first frame of the input video;
   detecting one or more markers of the second frame of the transition video;

computing a location of a camera relative to the marker, the camera being associated with recording of the transition video;

computing a transformation that warps the first frame of the input video over the marker;

warping the first frame of the input video based on the transformation; and overlaying the first frame of the input video over the marker, the overlaying being based, at least, on the warping.

9. The method of claim 8, wherein the computing the location is performed for the marker of the second frame of the transition video.

10. The method of claim 8, further comprising outputting the frame comprising the first frame of the input video overlaid on the marker.

11. A method, comprising:

employing a microprocessor to execute computer executable components stored within a memory to perform the following:

generating a frame comprising a first frame of a first input video overlaid on a marker of a second frame of a second input video, the generating comprising:

determining the second frame of the second input video;

determining the first frame of the first input video;

detecting one or more markers of the second frame of the second input video;

computing a transformation that warps the first frame of the first input video over the second frame of the second input video, the transformation being based, at least, on:

the marker of the second frame of the second input video; and a location of a camera relative to the marker, the camera being associated with recording of the transition video;

warping the first frame of the first input video based on the transformation; and overlaying the first frame of the first input video over the second input video, the overlaying being based, at least, on the warping.

\* \* \* \* \*